United States Patent
Goh

(10) Patent No.: US 7,239,172 B2
(45) Date of Patent: Jul. 3, 2007

(54) IMPEDANCE MATCHING

(75) Inventor: Ban Hok Goh, Singapore (SG)

(73) Assignee: Infineon Technologies AG, Munich (DE)

( * ) Notice: Subject to any disclaimer, the term of this patent is extended or adjusted under 35 U.S.C. 154(b) by 133 days.

(21) Appl. No.: 11/079,003

(22) Filed: Mar. 11, 2005

(65) Prior Publication Data

US 2006/0226867 A1    Oct. 12, 2006

(51) Int. Cl.
*H03K 19/003* (2006.01)
*H03K 19/23* (2006.01)

(52) U.S. Cl. .............................. 326/30; 326/32; 326/33

(58) Field of Classification Search ............ 326/30–34, 326/26–27
See application file for complete search history.

(56) References Cited

U.S. PATENT DOCUMENTS

| 6,292,014 B1 | 9/2001 | Hedberg |
| 6,741,095 B2 * | 5/2004 | Abrosimov et al. .......... 326/30 |
| 6,992,501 B2 * | 1/2006 | Rapport ....................... 326/30 |
| 2002/0053923 A1 | 5/2002 | Kim et al. |

* cited by examiner

Primary Examiner—Anh Q. Tran
(74) Attorney, Agent, or Firm—Maginot, Moore & Beck

(57) ABSTRACT

There is provided apparatus for connecting between a data source or a data receiver and a data line. The apparatus comprises an impedance and an impedance controller arranged to continually adjust the value of the active impedance so as to control the relative impedances of the total source, the total source comprising the data source and the impedance, and the data line or of the total receiver, the total receiver comprising the data receiver and the impedance, and the data line. There is also provided a semiconductor chip, connectable to a data line, the semiconductor chip comprising the apparatus together with a data source or data receiver, as appropriate. There is also provided a method for controlling impedance matching between a data source or data receiver and a data line. The method comprises the steps of providing an impedance connected between the data source or data receiver and the data line; and continually adjusting the value of the impedance so as to control the relative impedances of the total source or total receiver and the data line.

26 Claims, 4 Drawing Sheets

IMPEDANCE MATCHING

FIELD OF THE INVENTION

The invention relates to an apparatus and method for controlling the relative impedance of a data source and a data line or a data receiver and a data line.

BACKGROUND OF THE INVENTION

In any sort of data transmission, especially high speed data transmission, from a source, through a line to a receiver (or load), there is often an impedance mismatch. This occurs when the impedance of the source $Z_S$, the impedance of the line $Z_O$ and the impedance of the receiver $Z_L$ are not equal. This means that, at each boundary between one impedance and another, there will not be perfect transmission of the signal but there will be partial reflection.

This impedance mismatch can cause degradation of the transmitted signal, for example by overshoot, undershoot, ringing and stair step wave forms. Those waveform distortions are shown in FIG. 1.

In an attempt to deal with this problem, in printed circuit board (PCB) design, care is taken to match the trace impedance of the PCB (i.e. the characteristic impedance of the traces, or wires, on a PCB) with the source impedance $Z_S$, since the PCB trace impedance acts as the line impedance $Z_O$. However, due to variations in PCB geometry and operating conditions, the impedance will not, in fact, be consistent over several PCB boards or over different operating temperatures. Errors in signalling, caused, for example, by the types of signal degradation mentioned above, result.

An attempt has been made to solve this problem by adding an additional series resistor at the source, in order to match the source impedance and the line impedance (PCB trace) more accurately. The value of the series resistor can be chosen appropriately. Although this may work in some conditions, the series resistor typically has a tolerance of around 1% and this, coupled with a typical PCB tolerance of around 10%, can result in an 11% difference between the best matched case and the worst matched case This means inconsistent product design and yield loss.

An improvement on that arrangement has been suggested and comprises making the source series resistor programmable by a user. In that known arrangement, the series resistor may take one of several values and can be set to the most appropriate value by the user, according to operating conditions and the PCB trace impedance. This does improve the source to line impedance matching, but it does not remove signal degradation completely.

SUMMARY OF THE INVENTION

It is an object of the invention to provide an apparatus and method which mitigates or substantially overcomes the problems of known apparatus and methods described above.

According to a first aspect of the invention, there is provided apparatus for connecting between a data source and a data line, the apparatus comprising:
   an impedance; and
   an impedance controller arranged to continually adjust the value of the impedance so as to control the relative impedances of the total source, the total source comprising the data source and the impedance, and the data line.

The apparatus is connectable between the data source and the data line and, when in use, by means of the impedance controller, the impedance is continually adjusted in order to control the relative impedance of the total source (which is the impedance of the data source together with the impedance of the additional impedance) and the data line. This means that ongoing variations and fluctuations in the impedance of the data line (and the data source) can be taken into account. This also means that data lines having different impedances can be connected, at different times, to the same source without causing problems with impedance matching. The level of impedance matching can be controlled.

The impedance is preferably an active device i.e. a device capable of controlling voltage or current and able to create a switching action in the circuit. Active devices are typically semiconductor devices, for example diodes, transistors and integrated circuits. An active device (such as a transistor) is easier to control than a passive device, such as a resistor. In a preferred arrangement, a FET transistor or CMOS transistor is used.

In one embodiment (as described below), the impedance comprises only a single device. In an alternative embodiment, however, the impedance comprises more than one device in an appropriate configuration.

The term "continually" should be taken to have its usual meaning, that is: very frequently and without cessation. So, the impedance controller very frequently and unceasingly adjusts the value of the impedance. For example the adjustment could be made every clock cycle or at a multiple of the clock cycle. The rate of adjustment can be adjusted appropriately. For higher resolution, a higher rate of adjustment may be selected.

In some embodiments, it may be preferable to have perfect matching between the total source and the data line i.e. to set the impedance of the total source and the impedance of the data line to be equal. In some alternative embodiments, however, it may be preferable to have some impedance mismatch between the total source and the data line. The apparatus provides a way to set the level of impedance matching (or mismatching) to the desired level and maintain that desired level despite fluctuations in the line, source impedances.

In one embodiment, the impedance controller is arranged to adjust the difference between the impedance of the total source and the impedance of the data line towards a desired difference. The desired difference between the impedance of the total source and the impedance of the data line may be registered in a register. The active impedance controller may include the register. The register may be settable by a user.

In one embodiment, the impedance controller is arranged to compare a signal at the data source with a signal at the data line. A signal at the data source may be the original signal from the data source. A signal at the data line may differ from the original signal, for example it may be distorted. The difference between the signal at the data source and the signal at the data line may depend, inter alia, on the relative impedances of the total source and the data line. Thus, a comparison of the two signals will provide an indication of the relative impedances of the total source and the data line (Typically, the difference between the source and line signals will also depend on whether there is partial signal reflection at the far end of the data line due to an impedance mismatch between the line and a receiver.)

In that embodiment, the impedance controller may be arranged to measure the peak difference between the signal at the data source and the signal at the data line. If the signal at the data source is the original undistorted signal and the signal at the data line is distorted because of an impedance mismatch, the peak difference between the two signals may provide an Indication of the level of the impedance mismatch. The peak difference may be, for example, the amount of overshoot and/or undershoot on the distorted data line signal relative to the data source signal.

In that embodiment, the impedance controller may comprise a comparator arranged to compare the peak difference between the signal at the data source and the signal at the data line with a desired peak difference (for example the actual overshoot with the required overshoot). The impedance controller may comprise a register for storing the desired peak difference. The register may be settable by a user. The desired peak difference may be set to zero if it is desired to match the impedance of the total source exactly with the impedance of the data line. Alternatively, the desired peak difference may be set to a non-zero value if some impedance mismatch is desired.

For example, if the peak difference between the two signals is the overshoot (or undershoot), a non-zero value of peak difference may be desired, which corresponds to non-zero overshoot, as a non-zero overshoot may be associated with a quicker response time.

In that embodiment, the impedance controller is preferably arranged to adjust the value of the impedance in a direction such that the peak difference between the signal at the data source and the signal at the data line approaches the desired peak difference.

In one embodiment, the comparator is a differential amplifier arranged to compare the measured peak difference with a desired peak difference stored in the register.

The impedance controller preferably comprises an impedance driver to alter the value of the impedance. In one embodiment, the impedance is a transistor connectable to the data source at one of emitter and collector and connectable to the data line at the other of emitter and collector. In that embodiment, the impedance controller may be arranged to adjust the signal at the base of the transistor. The transistor may be a CMOS transistor.

The data source is preferably on a source semiconductor chip. The apparatus is preferably also on the source semiconductor chip.

Preferably, the data line is connected to a receiver. The receiver may be on a receiver semiconductor chip.

The data line is preferably on printed circuit board (PCB). In that case, the PCB trace impedance may be the impedance of the data line.

In one embodiment, the apparatus is on a source semiconductor chip also holding the data source, the data line is on PCB and a receiver Is on a receiver semiconductor chip at the other end of the data line.

According to the first aspect of the invention, there is also provided apparatus for connecting between a data receiver and a data line, the apparatus comprising:
an impedance; and
an impedance controller arranged to continually adjust the value of the impedance so as to control the relative impedances of the total receiver, the total receiver comprising the data receiver and the impedance, and the data line.

The apparatus is connectable between the data receiver and the data line and, when in use, by means of the impedance controller, the impedance is continually adjusted in order to control the relative impedance of the total receiver (which is the impedance of the data receiver together with the impedance of the additional impedance) and the data line. This means that ongoing variations and fluctuations in the impedance of the data line (and the data receiver) can be taken into account This also means that data lines having different impedances can be connected, at different times, to the same receiver without causing problems with impedance matching. The level of impedance matching can be controlled.

The impedance is preferably an active device i.e. a device capable of controlling voltage or current and able to create a switching action in the circuit. Active devices are typically semiconductor devices for example diodes, transistors and integrated circuits. An active device (such as a transistor) is easier to control than a passive device, such as a resistor. In a preferred arrangement, a FET transistor or CMOS transistor is used.

In one embodiment (as described below), the impedance comprises only a single device. In an alternative embodiment, however, the impedance comprises more than one device in an appropriate configuration.

The term "continually" should be taken to have its usual meaning, that is: very frequently and without cessation. So, the impedance controller very frequently and unceasingly adjusts the value of the impedance. For example the adjustment could be made every clock cycle or at a multiple of the clock cycle. The rate of adjustment can be adjusted appropriately. For higher resolution, a higher rate of adjustment may be selected.

In some embodiments, it may be preferable to have perfect matching between the total receiver and the data line i.e. to set the impedance of the total receiver and the impedance of the data line to be equal. In some alternative embodiments, however, it may be preferable to have some impedance mismatch between the total receiver and the data line. The apparatus provides a way to set the level of impedance matching (or mismatching) to the desired level and maintain that desired level despite fluctuations in the line and receiver impedances.

In one embodiment, the impedance controller is arranged to adjust the difference between the impedance of the total receiver and the impedance of the data line towards a desired difference. The desired difference between the impedance of the total receiver and the impedance of the data line may be registered in a register. The active impedance controller may include the register. The register may be settable by a user.

In one embodiment, the impedance controller is arranged to compare a signal at the data receiver with a signal at the data line. A signal at the data receiver may differ from a signal at the data line, for example it may be distorted. The difference between the signal at the data line and the signal at the data receiver may depend, inter alia, on the relative impedances of the total receiver and the data line. Thus, a comparison of the two signals will provide an indication of the relative impedances of the total receiver and the data line.

In that embodiment, the impedance controller may be arranged to measure the peak difference between the signal at the data receiver and the signal at the data line. The peak difference between the two signals may provide an indication of the level of the impedance mismatch. The peak difference may be, for example, the amount of overshoot and/or undershoot of one signal relative to the other signal.

In that embodiment, the impedance controller may comprise a comparator arranged to compare the peak difference between the signal at the data receiver and the signal at the data line with a desired peak difference (for example the actual overshoot with the required overshoot). The impedance controller may comprise a register for storing the desired peak difference. The register may be settable by a user. The desired peak difference may be set to zero if it is desired to match the impedance of the total receiver exactly with the impedance of the data line. Alternatively, the desired peak difference may be set to a non-zero value if some impedance mismatch is desired.

For example, if the peak difference between the two signals is the overshoot (or undershoot), a non-zero value of peak difference may be desired, which corresponds to non-zero overshoot, as a non-zero overshoot may be associated with a quicker response time.

In that embodiment, the impedance controller is preferably arranged to adjust the value of the impedance in a direction such that the peak difference between the signal at the data receiver and the signal at the data line approaches the desired peak difference.

In one embodiment, the comparator is a differential amplifier arranged to compare the measured peak difference with a desired peak difference stored in the register.

The impedance controller preferably comprises an impedance driver to alter the value of the impedance. In one embodiment, the impedance is a transistor connectable to the data receiver at one of emitter and collector and connectable to the data line at the other of emitter and collector In that embodiment, the impedance controller may be arranged to adjust the signal at the base of the transistor. The transistor may be a CMOS transistor.

The data receiver is preferably on a receiver semiconductor chip. The apparatus is preferably also on the receiver semiconductor chip.

Preferably, the data line is connected to a source. The source may be on a source semiconductor chip.

The data line is preferably on printed circuit board (PCB). In that case, the PCB trace impedance may be the impedance of the data line.

In one embodiment, the apparatus is on a receiver semiconductor chip also holding the data receiver, the data line is on PCB and a source is on a source semiconductor chip at the other end of the data line.

According to the first aspect of the invention, there is also provided apparatus for connecting between a data source and a data line or between a data receiver and a data line, the apparatus comprising:
an impedance; and
an impedance controller arranged to continually adjust the value of the impedance so as to control the relative impedances of the total source, the total source comprising the data source and the impedance, and the data line or the relative impedances of the total receiver, the total receiver comprising the data receiver and the impedance, and the data line.

According to the first aspect of the invention, there is also provided apparatus for connecting between a data source and a data line, the apparatus comprising:
an active impedance;
a comparator arranged to compare the peak difference between a signal at the data source and a signal at the data line with a desired peak difference; and
an impedance driver arranged to continually adjust the value of the active impedance so as to control the relative impedances of the total source, the total source comprising the data source and the active impedance, and the data line, wherein the comparator is connected to the impedance driver and the impedance driver is arranged to continually adjust the value of the active impedance in a direction such that the peak difference between the signal at the data source and the signal at the data line approaches the desired peak difference.

According to the first aspect of the invention, there is also provided apparatus for connecting between a data receiver and a data line, the apparatus comprising:
an active impedance;
a comparator arranged to compare the peak difference between a signal at the data receiver and a signal at the data line with a desired peak difference; and
an impedance driver arranged to continually adjust the value of the active impedance so as to control the relative impedances of the total receiver, the total receiver comprising the data receiver and the active impedance, and the data line, wherein the comparator is connected to the impedance driver and the impedance driver is arranged to continually adjust the value of the active impedance in a direction such that the peak difference between the signal at the data receiver and the signal at the data line approaches the desired peak difference.

According to a second aspect of the invention, there is also provided a semiconductor chip connectable to a data line, the semiconductor chip comprising:
at least one of a data source and a data receiver;
an impedance; and
an impedance controller arranged to continually adjust the value of the impedance so as to control the relative impedances of the total source, the total source comprising the data source and the impedance, and the data line or the relative impedances of the total receiver, the total receiver comprising the data receiver and the impedance, and the data line.

By means of the impedance controller, the total source or total receiver impedance can be continually adjusted in order to control the relative impedance of the total source (which is the impedance of the data source together with the additional impedance) and the data line or the relative impedance of the total receiver (which is the impedance of the data receiver together with the additional impedance). This means that the level of impedance matching can be controlled.

The impedance is preferably an active device i.e. a device capable of controlling voltage or current and able to create a switching action in the circuit. Active devices are typically semiconductor devices, for example diodes, transistors and integrated circuits. An active device (such as a transistor) is easier to control than a passive device, such as a resistor. In a preferred arrangement, a FET transistor or CMOS transistor is used.

In one embodiment (as described below), the impedance comprises only a single device. In an alternative embodiment, however, the impedance comprises more than one device in an appropriate configuration.

The term "continually" should be taken to have its usual meaning, that is: very frequently and without cessation. So, the impedance controller very frequently and unceasingly adjusts the value of the impedance. For example the adjustment could be made every clock cycle or at a multiple of the clock cycle. The rate of adjustment can be adjusted appropriately. For higher resolution, a higher rate of adjustment may be selected.

In some embodiments, it may be preferable to have perfect matching between the total source or total receiver and the data line i.e. to set the impedance of the total source or receiver and the impedance of the data line to be equal. In some alternative embodiments, however, it may be preferable to have some impedance mismatch between the total source or total receiver and the data line. The arrangement provides a way to set the level of impedance matching (or mismatching) to the desired level and maintain that desired level despite fluctuations in the line and source or receiver impedances.

The impedance controller may be arranged to adjust the difference between the impedance of the total source and the impedance of the data line or the difference between the impedance of the total receiver and the impedance of the data line to the desired difference. The desired difference may be registered in a register. The impedance controller may include the register. The register may be settable by a user.

The active impedance controller may be arranged to compare a signal at the data source or data receiver with a signal at the data line. The signal at the data source may be the original signal from the data source. The signal at the data line may differ from the original signal, for example it may be distorted. The difference between one signal and the other may depend, inter alia, on the relative impedances of the total source or the total receiver and the data line. Thus, a comparison of the two signals provides an indication of the relative impedances of the total source and the data line or the total receiver and the data line.

The active impedance controller may be arranged to measure the peak difference between the signal at the data source or at the data receiver and the signal at the data line. The peak difference between the two signals may provide an indication of the level of the impedance mismatch. The peak difference may be, for example, the amount of overshoot and/or undershoot on one distorted signal relative to the other undistorted or less distorted signal.

The impedance controller preferably comprises a comparator arranged to compare the peak difference between a signal at the data source and a signal at the data line or the peak difference between a signal at the data receiver and a signal at the data line with a desired peak difference.

The impedance controller may comprise a register for storing the desired peak difference. The register may be settable by a user. The desired peak difference may be set to zero if it is desired to match the impedance of the total source or total receiver exactly with the impedance of the data line. Alternatively, the desired peak difference may be set to a non-zero value if some impedance mismatch is desired. For example, if the peak difference between the two signals is the overshoot (or undershoot), a non-zero value of peak difference may be desired, as this will mean some overshoot, which may be associated with a quicker response time.

In one embodiment, the comparator is a differential amplifier arranged to compare the measured peak difference with a desired peak difference stored in the register.

The impedance controller may comprise an impedance driver arranged to alter the value of the impedance. In one embodiment, the impedance is a transistor connectable to the data source or data receiver at one of emitter and collector and connectable to the data line at the other of emitter and collector. In that embodiment, the impedance controller may be arranged to adjust the signal at the base of the transistor. The transistor may be a CMOS transistor.

The data line may be on printed circuit board (PCB) and the PCB trace impedance may be the impedance of the data line.

According to the second aspect of the invention, there is also provided a semiconductor chip connectable to a data line, the semiconductor chip comprising:
at least one of a data source and a data line;
an active impedance;.

a comparator arranged to compare the peak difference between a signal at the data source and a signal at the data line or between a signal at the data receiver and a signal at the data line with a desired peak difference; and
an impedance driver arranged to continually adjust the value of the active impedance so as to control the relative impedances of the total source, the total source comprising the data source and the active impedance, and the data line, or the relative impedances of the total receiver, the total receiver comprising the data receiver and the active Impedance, and the data line, wherein the comparator is connected to the impedance driver and the impedance driver is arranged to continually adjust the value of the active impedance in a direction such that the peak difference between the signal at the data source or data receiver and the signal at the data line approaches the desired peak difference.

According to a third aspect of the invention, there is also provided a method for controlling impedance matching between a data source and a data line or between a data receiver and a data line, the method comprising the steps of:
providing an impedance connected between the data source and the data line or between the data receiver and the data line;
continually adjusting the value of the active impedance so as to control the relative impedances of the total source, the total source comprising the data source and the impedance, and the data line or the relative impedances of the total receiver, the total receiver comprising the data receiver and the impedance, and the data line.

Because the value of the impedance is continually adjusted, ongoing variations and fluctuations in the impedance of the data line (and the data source or data receiver) can be taken into account. This also means that data lines having different impedances can be connected, at different times, to the same source or receiver without causing problems with impedance matching. The level of impedance matching can be controlled.

The impedance is preferably an active device i.e. a device capable of controlling voltage or current and able to create a switching action in the circuit. Active devices are typically semiconductor devices, for example diodes, transistors and integrated circuits. An active device (such as a transistor) is easier to control than a passive device, such as a resistor. In a preferred arrangement, a FET transistor or CMOS transistor is used.

In some embodiments, it may be preferable to have perfect matching between the total source or total receiver and the data line i.e. to continually adjust the value of the impedance such that the impedance of the total source or total receiver and the impedance of the data line are maintained equal. In some alternative embodiments, however, it may be preferable to have some impedance mismatch between the total source or total receiver and the data line i.e. to continually adjust the value of the active impedance such that there is a predetermined difference between the impedance of the total source or total receiver and the impedance of the data line. The method provides a way to set the level of impedance matching (or mismatching) to the desired level and maintain that desired level despite fluctuations in the source, receiver and line impedances, due to, for example, temperature fluctuations.

In one embodiment, the step of continually adjusting the value of the impedance comprises:
registering the desired difference between the impedance of the total source and the impedance of the data line or between the impedance of the total receiver and the impedance of the data line; and continually adjusting the difference between the impedance of the total source and the impedance of the data line or the difference between the impedance of the total receiver and the impedance of the data line to the desired difference.

In one embodiment, the step of continually adjusting the value of the impedance comprises comparing a signal at the data source or data receiver with a signal at the data line. A signal at the data source may be the original signal from the data source. A signal at the data line may differ from the original signal, for example it may be distorted. The difference between one signal and the other may depend, inter alia, on the relative impedances of the total source and the data line or total receiver and the data line. Thus, a comparison of the two signals will provide an indication of the relative impedances.

In that embodiment, the step of continually adjusting the value of the impedance may comprise determining the peak difference between the signal at the data source or data receiver and the signal at the data line. If one signal is more distorted than the other signal (for example, one may be an undistorted signal and the other may be distorted because of an impedance mismatch), the peak difference between the two signals may provide an indication of the level of the impedance mismatch. The peak difference may be, for example, the amount of overshoot and/or undershoot on one signal relative to the other signal.

In that embodiment, the step of continually adjusting the value of the impedance may comprise comparing the peak difference between the signal at the data source and the signal at the data line or between the signal at the data receiver and the signal at the data line with a desired peak difference (for example the actual overshoot with the required overshoot).

The desired peak difference may be stored in a register. The register may be settable by a user. The desired peak difference may be set to zero if it is desired to match the impedance of the total source or total receiver exactly with the impedance of the data line. Alternatively, the desired peak difference may be set to a non-zero value if some impedance mismatch is desired. For example, if the peak difference between the two signals is the overshoot (or undershoot), a non-zero value of peak difference may be desired, which corresponds to non-zero overshoot, as a non-zero overshoot may be associated with a quicker response time.

The step of continually adjusting the value of the impedance may comprise adjusting the value of the impedance once every clock cycle. The step of continually adjusting the value of the impedance may comprise adjusting the value of the impedance more than once every clock cycle.

The step of providing an impedance connected between the data source and the data line or between the data receiver and the data line may comprise providing a transistor connected to the data source or data receiver at one of emitter and collector and connectable to the data line at the other of emitter and collector. In that embodiment, the step of continually adjusting the value of the impedance may comprise continually adjusting the signal at the base of the transistor. The transistor may be a CMOS transistor.

The data source or data receiver is preferably on a semiconductor chip. The active impedance is preferably also on the semiconductor chip.

The data line is preferably on printed circuit board (PCB). In that case, the PCB trace impedance may be the impedance of the data line.

In one embodiment, the impedance is on a source semiconductor chip also holding the data source, the data line is on PCB and the receiver is on a receiver semiconductor chip at the other end of the data line. In another embodiment, the impedance is on a receiver semiconductor chip also holding the data receiver, the data line is on PCB and the source is on a source semiconductor chip at the other end of the data line According to the third aspect of the invention, there is also provided a method for controlling impedance matching between a data source and a data line, the method comprising the steps of:

providing an active impedance connected between the data source and the data line;

comparing a signal at the data source with a signal at the data line;

determining the peak difference between the signal at the data source and the signal at the data line;

comparing the peak difference between the signal at the data source and the signal at the data line with a desired peak difference; and continually adjusting the value of the active impedance in a direction such that the peak difference approaches the desired peak difference, so as to control the relative impedances of the total source, the total source comprising the data source and the active impedance, and the data line.

According to the third aspect of the invention, there is also provided a method for controlling impedance matching between a data receiver and a data line, the method comprising the steps of:

providing an active impedance connected between the data receiver and the data line;

comparing a signal at the data receiver with a signal at the data line;

determining the peak difference between the signal at the data receiver and the signal at the data line;

comparing the peak difference between the signal at the data receiver and the signal at the data line with a desired peak difference; and continually adjusting the value of the active impedance in a direction such that the peak difference approaches the desired peak difference, so as to control the relative impedances of the total receiver, the total receiver comprising the data receiver and the active impedance, and the data line.

BRIEF DESCRIPTION OF THE DRAWINGS

An exemplary embodiment of the invention will now be described with reference to the accompanying drawings, of which

DETAILED DESCRIPTION OF THE PREFERRED EMBODIMENT

Figure 1:
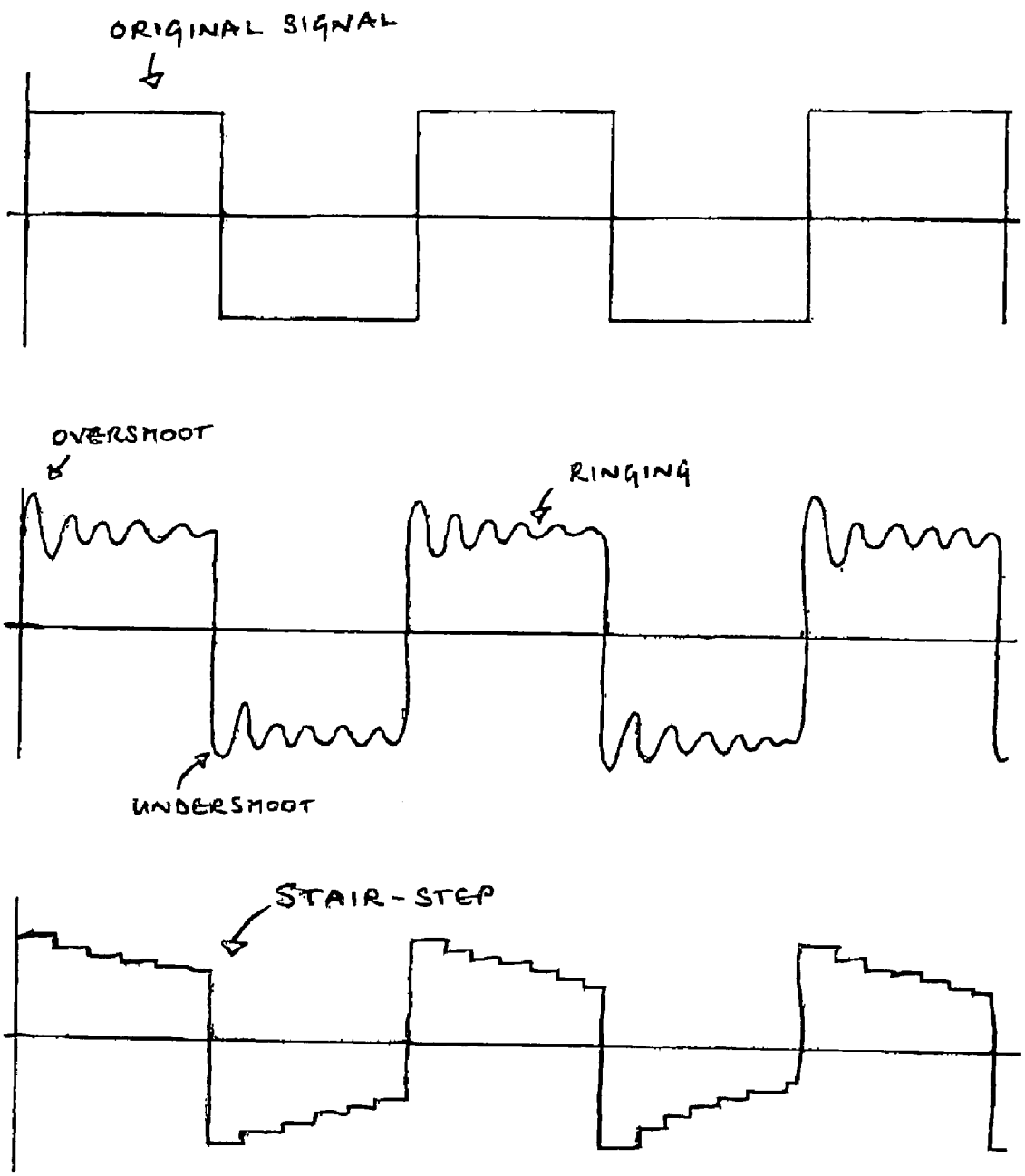
FIG. 1 is an illustration of signal degradation.

As already described, FIG. 1 shows some possible forms of signal degradation, in particular ringing, overshoot, undershoot and stair step waveforms.

Figure 2:
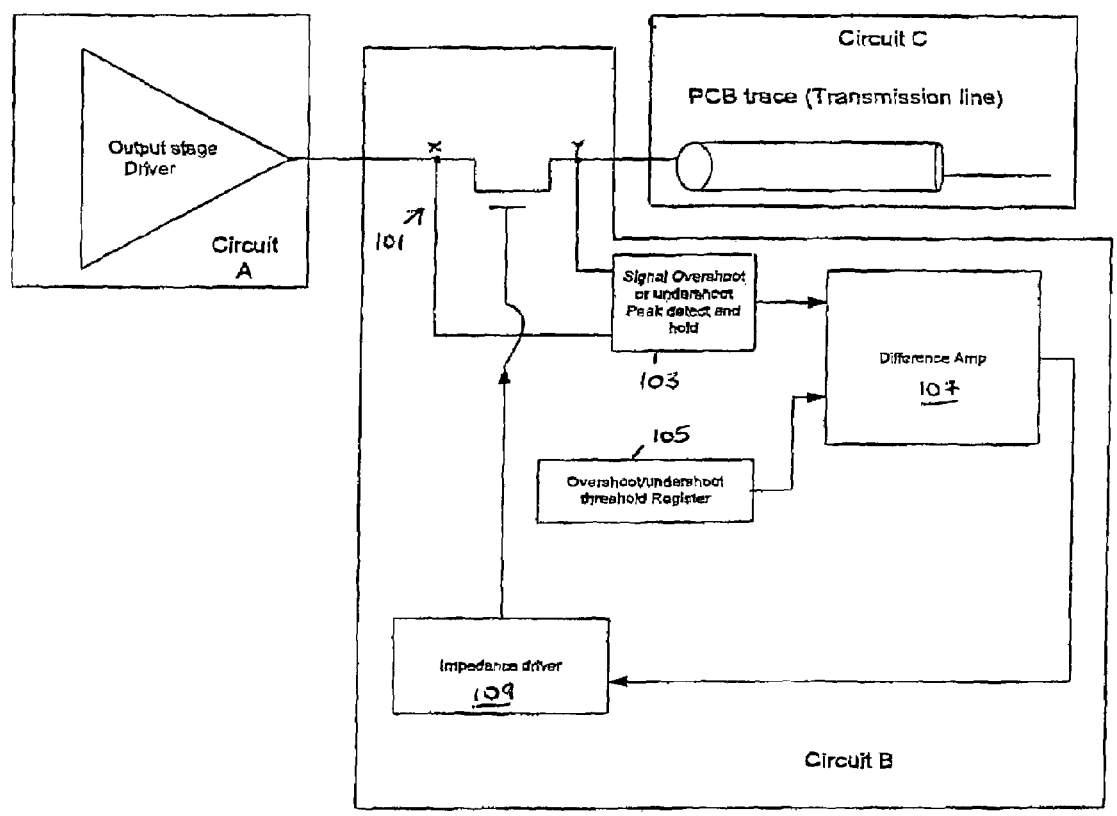
FIG. 2 is a schematic diagram of a first embodiment of the invention.

FIG. 2 shows an embodiment in which the invention is used at the source end, and aims to match the source and line impedance to reduce signal degradation The arrangement includes output signal driver (the source—circuit A) and transmission line (the line—circuit C) in the form of a PCB having a particular trace impedance which acts as the line impedance. In addition, the arrangement includes circuit B, located between the source and the line. Circuit A is typically located on an Integrated Chip (IC) and circuit C is outside the IC and connected to another IC (the receiver—not shown). Circuit B is preferably incorporated onto the IC.

Circuit B comprises an active impedance 101, shown here in the form of a transistor, a detector 103 to compare the signals at two nodes X and Y, a threshold register 105, a differential amplifier 107 for detecting the difference between the value from detector 103 and the value at register 105 and an impedance driver 109 for controlling the active impedance 101.

Active impedance 101 could be any suitable active impedance such as a transistor. One preferred example is a CMOS transistor.

Detector 103 compares the signals (i.e. voltages) at the two nodes X and Y. The signal at node X is simply the original outgoing source signal. The signal at node Y is the degraded signal. The signal at Y has been degraded as a result of only partial transmission at the source to line boundary ($Z_S$ to $Z_O$ boundary) and partial reflection at the line to receiver boundary ($Z_O$ to $Z_L$ boundary—not shown). The differential between signals X and Y is simply the voltage across the active impedance. The detector 103 compares the original signal at X with the degraded signal at Y. It detects the peak difference (e.g. the maximum overshoot or undershoot) and stores that peak value.

Register 105 is a threshold register where the overshoot and undershoot thresholds may be set by a user. The thresholds are discussed further below.

Differential amplifier 107 compares the actual overshoot or undershoot from detector 103 with the required overshoot or undershoot from register 105 and this difference in signal strength is used by the impedance driver 109 which changes the active impedance to match the line impedance variations that may be occurring constantly i.e. to try to match the required overshoot and the actual overshoot at all times.

Figure 3:
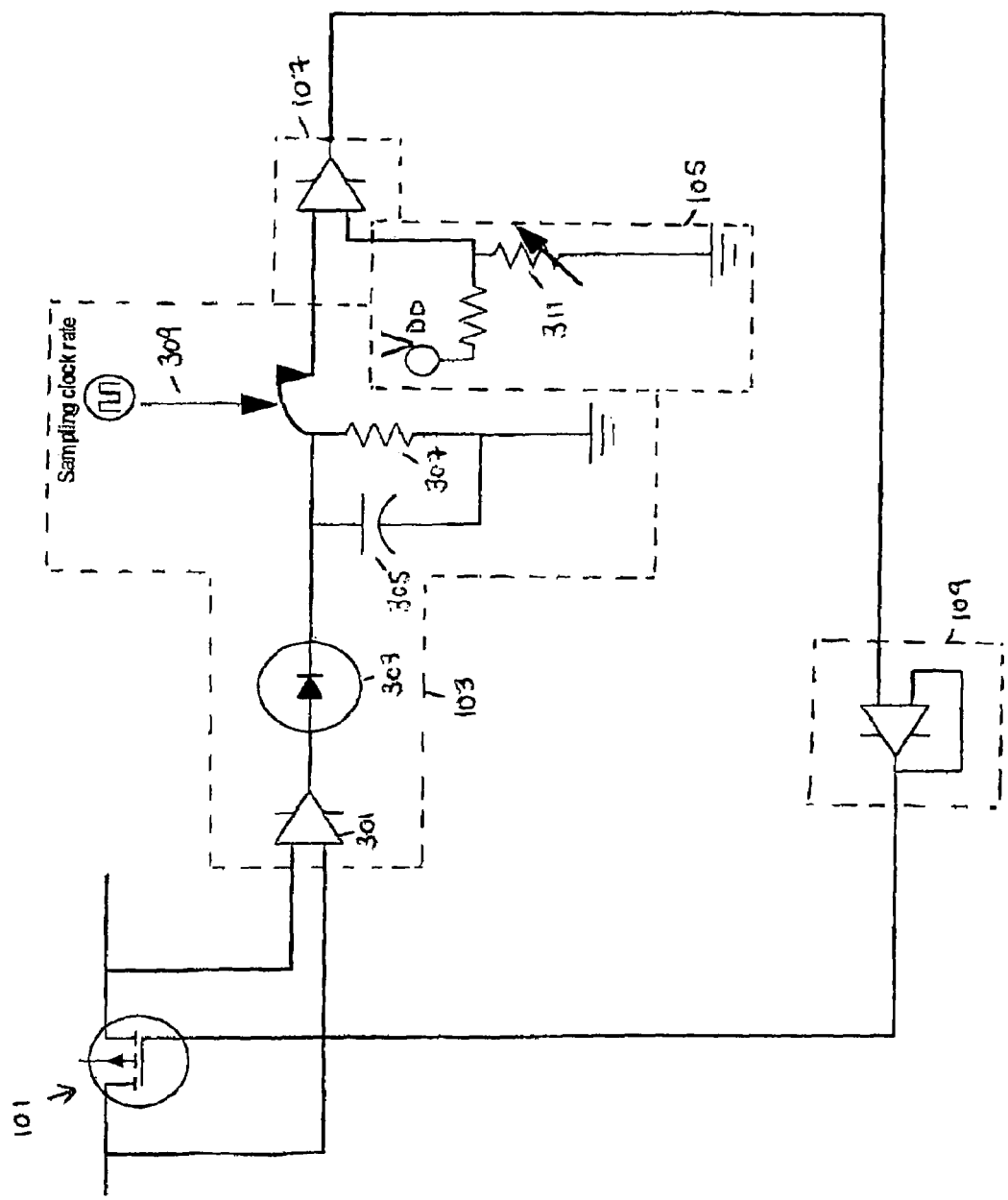
FIG. 3 is a circuit diagram of the embodiment of FIG. 2.

FIG. 3 is a possible circuit diagram of circuit B of FIG. 2. Referring to FIG. 3, active impedance 101 is a CMOS transistor. Detector 103 comprises a differential amplifier 301, a diode 303, a capacitor 305, a resistor 307 and a switch arrangement 309 controlled by a particular sampling clock rate. Operation of the detector 103 is as follows. Differential amplifier 301 receives the X and Y signals and produces a signal proportional to the difference between those two signals. Diode 303 half wave rectifies the signal so as to provide a DC voltage for the capacitor 305. The capacitor charges up in accordance with the DC signal provided by the diode 305. Thus, the amount of charge stored on the capacitor is proportional to the peak difference between the X and Y signals. At a particular clock rate, the switch closes and allows capacitor 305 to discharge via resistor 307. Thus, the voltage at one side of the differential amplifier 107 is proportional to the peak difference between X and Y over the last clock cycle.

Register 105 comprises a resistor divider and the required voltage, as a proportion of $V_{DD}$, can be set using variable resistor 311. Thus, differential amplifier 107 compares the peak difference voltage with the required voltage.

PCB traces have a tolerance of about 10%, which affects the accuracy of the line impedance. Changes in operating conditions (e.g. temperature, voltage) change the line impedance and result in impedance mismatching between the source and line (or the line and the receiver) and hence signal degradation. The line impedance may be constantly changing. In the arrangement of FIGS. 2 and 3, the overshoot or undershoot is dependent on the degree of inaccuracy of the impedance matching between the line trace impedance and the source active impedance. If the invention were used at a receiver, the overshoot or undershoot would depend on the degree of inaccuracy of the impedance matching between the line trace impedance and the receiver active impedance.

To compensate for this changing line impedance, circuit B auto-tunes the active impedance to match the line impedance, on a continual basis. Because the arrangement of circuit B is a closed loop, it is able to continually self-adjust and match the source impedance and line impedance as closely as possible.

It should be noted that the overshoot and undershoot required can be set by a user via threshold register 105. This is because, in some cases (especially high speed transmission), a small amount of overshoot is advantageous. This is because some overshoot means that the signal reaches the required level more quickly than if there were no overshoot at all. Thus, the response time is quicker.

Therefore, it can be seen that the role of circuit B in FIG. 1 is to monitor the signal overshoot (or undershoot) over the line and automatically control the current flowing through the load impedance. Thus, circuit B is able to automatically adjust the impedance of the chip output to match the incoming transmission line impedance.

Figure 4:
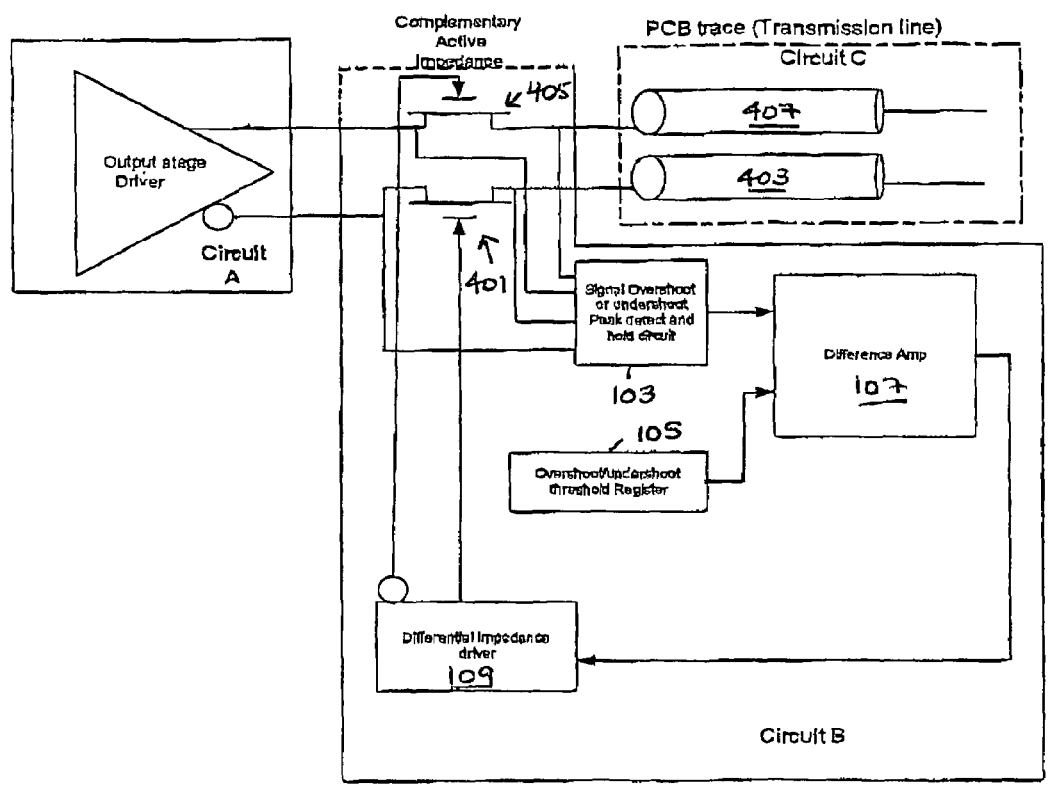
FIG. 4 is a schematic diagram of a second embodiment of the invention.

FIG. 4 shows a second embodiment of the invention, where the arrangement is used on a chip between two transmission lines i.e. a double ended implementation. As can be seen in FIG. 4, there is a second active impedance which drives the negative end i.e. a complementary circuit.

Just as with FIG. 2, the arrangement includes output signal driver (circuit A). However, there are now two transmission lines in circuit C—one for receiving data and one for transmitting data. The two lines may be on the same or different PCBs which will, of course affect their relative trace impedances. As before, the arrangement includes Circuit B. Circuit B in FIG. 4, however, includes two active impedances 401, 405. The first active impedance acts between circuit A and the first transmission line 403. The second active impedance 405 acts between circuit A and the second transmission line 407. Each active impedance operates in a similar way to that described in FIG. 2.

An advantage of the invention is that no external series resistor is required, because the series resistor of the prior art has now been replaced by an impedance which is preferably active and preferably incorporated onto the IC itself. This helps to reduce PCB size at the same time as improving signal integrity (reduced reflections, overshoot, undershoot and ringing). The circuit is able to cope well with changes in trace impedance of PCB boards and changes in operating conditions such as temperature.

The invention may be applied to any arrangement for data transmission (e.g. a clock driver or a data line). The invention is particular advantageous when used in high speed data transmission where quick response times are required and reduced signal degradation is particularly important.

The invention claimed is:

1. Apparatus for connecting between a data source and a data line, the apparatus comprising:
    an impedance; and
    an impedance controller arranged to continually adjust the value of the impedance so as to control the relative impedances of the total source, the total source comprising the data source and the impedance, and the data line, wherein the impedance controller is arranged to adjust the difference between the impedance of the total source and the impedance of the data line towards a desired difference.

2. Apparatus for connecting between a data source and a data line, the apparatus comprising:
    an impedance; and
    an impedance controller arranged to continually adjust the value of the impedance so as to control the relative impedances of the total source, the total source comprising the data source and the impedance, and the data line, wherein the impedance controller is arranged to compare a signal at the data source with a signal at the data line.

3. Apparatus for connecting between a data receiver and a data line, the apparatus comprising:
    an impedance; and
    an impedance controller arranged to continually adjust the value of the impedance so as to control the relative impedances of the total receiver, the total receiver comprising the data receiver and the impedance, and the data line, wherein the impedance controller is arranged to adjust the difference between the impedance of the total receiver and the impedance of the data line towards a desired difference.

4. Apparatus for connecting between a data receiver and a data line, the apparatus comprising:
    an impedance; and
    an impedance controller arranged to continually adjust the value of the impedance so as to control the relative impedances of the total receiver, the total receiver comprising the data receiver and the impedance, and the data line, wherein the impedance controller is arranged to compare a signal at the data receiver with a signal at the data line.

5. A semiconductor chip connectable to a data line, the semiconductor chip comprising:
    at least one of a data source and a data receiver;
    an impedance; and
    an impedance controller arranged to continually adjust the value of the impedance so as to control the relative impedances of the total source, the total source comprising the data source and the impedance, and the data line or the relative impedances of the total receiver, the total receiver comprising the data receiver and the impedance, and the data line, wherein the impedance controller is arranged to adjust the difference between the impedance of the total source or the total receiver and the impedance of the data line towards a desired difference.

6. A method for controlling impedance matching between a data source and a data line or between a data receiver and a data line, the method comprising the steps of:
    providing an impedance connected between the data source and the data line or between the data receiver and the data line;
    continually adjusting the value of the active impedance so as to control the relative impedances of the total source, the total source comprising the data source and the impedance, and the data line or the relative impedances of the total receiver, the total receiver comprising the data receiver and the impedance, and the data line, wherein the step of continually adjusting the value of the active impedance comprises adjusting the difference between the impedance of the total source or the total receiver and the impedance of the data line towards a desired difference.

7. A semiconductor chip connectable to a data line, the semiconductor chip comprising:
    at least one of a data source and a data receiver;
    an impedance; and
    an impedance controller arranged to continually adjust the value of the impedance so as to control the relative impedances of the total source, the total source comprising the data source and the impedance, and the data line or the relative impedances of the total receiver, the total receiver comprising the data receiver and the impedance, and the data line, wherein the impedance controller is arranged to compare a signal at the data source with a signal at the data line or a signal at the data receiver with a signal at the data line.

8. A method for controlling impedance matching between a data source and a data line or between a data receiver and a data line, the method comprising the steps of:
    providing an impedance connected between the data source and the data line or between the data receiver and the data line;
    continually adjusting the value of the active impedance so as to control the relative impedances of the total source, the total source comprising the data source and the impedance, and the data line or the relative impedances of the total receiver, the total receiver comprising the data receiver and the impedance, and the data line, wherein the step of continually adjusting the value of the active impedance comprises comparing a signal at the data source with a signal at the data line or a signal at the data receiver with a signal at the data line.

9. Apparatus according to claim 1 wherein the impedance is an active device.

10. Apparatus according to claim 2, wherein the impedance controller is arranged to measure the peak difference between the signal at the data source and the signal at the data line.

11. Apparatus according to claim 10 wherein the impedance controller comprises a comparator arranged to compare the peak difference between signal at the data source and the signal at the data line with a desired peak difference.

12. Apparatus according to claim 11, wherein the impedance controller comprises a register for storing the desired peak difference.

13. Apparatus according to claim 1 wherein the data source and the apparatus are on a source semiconductor chip.

14. Apparatus according to claim 1 wherein the data line is on printed circuit board (PCB) and the PCB trace impedance is the impedance of the data line.

15. Apparatus according to claim 3, wherein the impedance is an active device.

16. Apparatus according to claim 4, wherein the impedance controller is arranged to measure the peak difference between the signal at the data receiver and the signal at the data line.

17. Apparatus according to claim 16 wherein the impedance controller comprises a comparator arranged to compare the peak difference between signal at the data receiver and the signal at the data line with a desired peak difference.

18. Apparatus according to claim 17, wherein the impedance controller comprises a register for storing the desired peak difference.

19. Apparatus according to claim 3 wherein the data receiver and the apparatus are on a source semiconductor chip.

20. Apparatus according to claim 3 wherein the data line is on printed circuit board (PCB) and the PCB trace impedance is the impedance of the data line.

21. Apparatus according to claim 2, wherein the impedance is an active device.

22. Apparatus according to claim 2 wherein the data source and the apparatus are on a source semiconductor chip.

23. Apparatus according to claim 2 wherein the data line is on printed circuit board (PCB) and the PCB trace impedance is the impedance of the data line.

24. Apparatus according to claim 4, wherein the impedance is an active device.

25. Apparatus according to claim 4 wherein the data receiver and the apparatus are on a source semiconductor chip.

26. Apparatus according to claim 4 wherein the data line is on printed circuit board (PCB) and the PCB trace impedance is the impedance of the data line.

* * * * *